(12) United States Patent
Park et al.

(10) Patent No.: US 11,319,863 B2
(45) Date of Patent: May 3, 2022

(54) FLOW CONTROL VALVE APPARATUS

(71) Applicants: Hyundai Motor Company, Seoul (KR); Kia Motors Corporation, Seoul (KR); NTM Co., Ltd., Chungcheongnam-do (KR)

(72) Inventors: Cheol Soo Park, Gyeonggi-Do (KR); Jun Sik Park, Seoul (KR); Bong Sang Lee, Gyeonggi-do (KR); Seok Yoon Chang, Gyeonggi-do (KR); Tae Ho Han, Gyeonggi-do (KR); Ho Young Jang, Busan (KR)

(73) Assignees: Hyundai Motor Company, Seoul (KR); Kia Motors Corporation, Seoul (KR); NTM Co., Ltd., Chungcheongnam-do (KR)

( * ) Notice: Subject to any disclaimer, the term of this patent is extended or adjusted under 35 U.S.C. 154(b) by 0 days.

(21) Appl. No.: 16/891,855

(22) Filed: Jun. 3, 2020

(65) Prior Publication Data
US 2021/0239032 A1    Aug. 5, 2021

(30) Foreign Application Priority Data

Jan. 31, 2020  (KR) .................. 10-2020-0011844

(51) Int. Cl.
| | | |
|---|---|---|
| *F01P 7/14* | (2006.01) | |
| *F16K 27/02* | (2006.01) | |
| *F16K 11/085* | (2006.01) | |
| *F16K 3/08* | (2006.01) | |
| *F16K 11/087* | (2006.01) | |

(52) U.S. Cl.
CPC .................. *F01P 7/14* (2013.01); *F16K 3/08* (2013.01); *F16K 11/0856* (2013.01); *F16K 11/0873* (2013.01); *F16K 27/0263* (2013.01); *F01P 2007/146* (2013.01)

(58) Field of Classification Search
CPC .. F01P 2007/146; F01P 7/14; F01P 2003/028; F01P 2003/027; F01P 2003/024; F01P 2003/021; F01P 3/02; F16K 11/087; F16K 11/0873; F16K 11/0876; F16K 11/0856; F16K 11/085; F16K 3/08; F16K 11/0746; F16K 11/074
See application file for complete search history.

(56) References Cited

U.S. PATENT DOCUMENTS 4,187,881 A    2/1980  Kull
4,219,049 A *  8/1980  Skelly ................... F16K 11/074
                                                   137/625.3

(Continued)

FOREIGN PATENT DOCUMENTS

DE    19632533 C1 * 10/1997 ............ F16K 11/074
EP    2713083 A1 *  4/2014 ........... F16K 5/0471

(Continued)

*Primary Examiner* — David Colon-Morales
(74) *Attorney, Agent, or Firm* — Mintz Levin Cohn Ferris Glovsky and Popeo, P.C.; Peter F. Corless (57) ABSTRACT

A flow control valve apparatus is provided in which a main valve adjusts the flow rate of cooling water by operating a plurality of ports and a sub-valve that operates with the main valve adjusts the flow rates of the cooling water circulating through a cylinder block and a cylinder head. The flow rate of the cooling water is variously adjusted based on the operation conditions of a vehicle.

11 Claims, 7 Drawing Sheets

(56) References Cited

U.S. PATENT DOCUMENTS

| | | | | |
|---|---|---|---|---|
| 4,425,935 A * | 1/1984 | Gonzalez | | F16K 3/08 |
| | | | | 137/315.12 |
| 5,190,077 A * | 3/1993 | Pawelzik | | F16K 11/0746 |
| | | | | 137/597 |
| 5,507,315 A | 4/1996 | Parker | | |
| 5,950,576 A * | 9/1999 | Busato | | F16K 11/0743 |
| | | | | 123/41.08 |
| 7,163,194 B2 | 1/2007 | Pervaiz | | |
| 7,168,397 B2 * | 1/2007 | Chanfreau | | B60H 1/00485 |
| | | | | 123/41.01 |
| 7,726,266 B2 * | 6/2010 | Komurian | | F16K 11/0856 |
| | | | | 123/41.08 |
| 8,281,814 B2 | 10/2012 | Kim | | |
| 8,578,966 B2 | 11/2013 | Thomas et al. | | |
| 8,763,640 B2 | 7/2014 | Kojima et al. | | |
| 8,919,378 B2 * | 12/2014 | Bartnick | | F16K 11/0856 |
| | | | | 137/625.47 |
| 9,435,248 B2 * | 9/2016 | Park | | F01P 3/02 |
| 9,657,464 B2 * | 5/2017 | Dunki-Jacobs | | G05D 7/0617 |
| 9,670,825 B2 * | 6/2017 | Murakami | | F16K 31/04 |
| 9,803,759 B2 | 10/2017 | Bachofer | | |
| 9,897,217 B2 * | 2/2018 | Greene | | F16K 11/085 |
| 9,945,283 B2 | 4/2018 | Muizelaar et al. | | |
| 10,151,517 B2 * | 12/2018 | Thybo | | F16K 11/074 |
| 10,295,076 B2 | 5/2019 | Russalian | | |
| 10,352,460 B2 | 7/2019 | Jang et al. | | |
| 10,514,103 B2 | 12/2019 | Yumisashi et al. | | |
| 10,539,064 B2 * | 1/2020 | Sato | | F01P 7/14 |
| 10,808,863 B2 | 10/2020 | Bugeja et al. | | |
| 10,865,888 B2 | 12/2020 | Grosskopf et al. | | |
| 10,927,972 B2 | 2/2021 | Murakami | | |
| 10,968,809 B2 | 4/2021 | Yoshimura et al. | | |
| 10,975,975 B2 | 4/2021 | Sato | | |
| 11,098,807 B2 | 8/2021 | Suzuki | | |
| 11,098,808 B2 | 8/2021 | Ozeki et al. | | |
| 2007/0234979 A1 | 10/2007 | Pipkorn et al. | | |
| 2008/0245881 A1 | 10/2008 | Peric | | |
| 2010/0126612 A1 * | 5/2010 | Huang | | F16K 11/074 |
| | | | | 137/625.41 |
| 2015/0361865 A1 | 12/2015 | Lee | | |
| 2016/0003125 A1 * | 1/2016 | Lee | | F01P 3/02 |
| | | | | 123/41.08 |
| 2016/0273671 A1 | 9/2016 | Chang et al. | | |
| 2016/0363236 A1 | 12/2016 | Smith et al. | | |
| 2018/0066758 A1 | 3/2018 | Yumisashi et al. | | |
| 2018/0149073 A1 | 5/2018 | Shen et al. | | |
| 2018/0230891 A1 | 8/2018 | Sato | | |
| 2019/0017612 A1 * | 1/2019 | Ikemoto | | F01P 7/14 |
| 2019/0072191 A1 * | 3/2019 | Shen | | F01P 7/165 |
| 2019/0085987 A1 | 3/2019 | Grosskopf et al. | | |
| 2019/0309862 A1 * | 10/2019 | Yu | | F16K 31/535 |
| 2020/0300152 A1 | 9/2020 | Park et al. | | |

FOREIGN PATENT DOCUMENTS

| | | |
|---|---|---|
| EP | 3006794 A1 | 4/2016 |
| JP | 2017-078341 A | 4/2017 |
| KR | 101558377 B1 | 10/2015 |

* cited by examiner

FLOW CONTROL VALVE APPARATUS

CROSS REFERENCE TO RELATED APPLICATION

The present application claims priority to Korean Patent Application No. 10-2020-0011844, filed Jan. 31, 2020, the entire contents of which is incorporated herein for all purposes by this reference.

BACKGROUND

Field of the Invention

The present disclosure relates to a flow control valve apparatus, and more particularly, to a flow control valve that selectively changes a plurality of cooling water passages.

Description of the Related Art

The fuel efficiency of an engine of a vehicle is insufficient in the initial cold startup condition compared to the condition with the engine sufficiently warmed up. In particular, friction in the engine is substantial due to high viscosity at low temperature of oil in a cold operation, a substantial amount of heat is lost through the walls of cylinders due to low temperature of the walls, and combustion is relatively unstable.

Accordingly, the temperature of the engine must be rapidly increased to the normal level early in the startup process to improve the fuel efficiency of the vehicle and the durability of the engine. Heat management control of an engine for solving this problem is a technology that improves fuel efficiency and power and reduces exhaust gas by maximally using the heat generated from an engine to warm up the engine at cold startup, and a flow stop valve, a clutch type water pump, an electric water pump, a flow control valve, etc. are representative of this technology.

According to the flow stop valve, a controllable valve is disposed at an engine outlet or an engine supply side and stops flow of cooling water for the engine when the engine is warmed up, thereby reducing the engine warm-up time. Similarly, the clutch type water pump and the electric water pump are operated in the same way, thereby rapidly warming up the engine.

On the other hand, the flow control valve also variably adjusts the flow rate, thereby supplying cooling water increased in temperature first to an oil warmer or an automatic transmission fluid (ATF) warmer. Accordingly, the temperatures of engine oil, transmission oil, and the entire engine may be rapidly increased, and thus rapid warm-up may be optimally achieved. However, since the flow control valve of the related art does not separately adjust the flow rates of cooling water that circulates through cylinder heads and cylinder blocks, it has a limitation in improving cooling efficiency according to circulation of the cooling water.

The description provided above as a related art of the present disclosure is merely for helping understanding the background of the present disclosure and should not be construed as being included in the related art known by those skilled in the art.

SUMMARY

The present disclosure provides a flow control valve apparatus that adjusts the flow rates of cooling water flowing through a plurality of cooling water passage and adjusts the flow rates of cooling water circulating cylinder blocks and cylinder heads.

In order to achieve the objectives of the present disclosure, a flow control valve apparatus may include: a housing having a plurality of flow ports including a first port through which cooling water for a cylinder block flows and a second port through which cooling water for a cylinder head flows; a main valve rotatably disposed in the housing and configured to selectively circulate cooling water through some of the flow ports based on rotational angles; and a sub-valve disposed in the second port of the housing and configured to adjust a flow rate of the cooling water flowing through the second port by adjusting the opening amount of the second port based on the rotational angle of the main valve, in which the second port has a first open section that is continuously connected to an inside of the housing and a second open section that extends from the first open section to the sub-valve and having opening amount that is adjusted by the sub-valve.

The main valve may have a hollow structure with an open end and may have flow rate control apertures provided in a circumferential surface to be connected to the flow ports including the first port based on rotational angles, and the open end may be connected to the second port. The sub-valve may be coupled to the end of the main valve and may be configured to rotate with the main valve. The sub-valve may have the same shape as the end of the main valve and may have a closed cross-section, and an aperture that connects the second port and a hollow portion of the main valve may be provided in the closed cross-section.

The aperture may extend around the closed cross-section about an axial center of the sub-valve. The aperture may have a width that gradually increases or gradually decreases in an extension direction. A plurality of ribs may be provided in a width direction in the aperture and the ribs may be spaced apart from each other in the extension direction. The aperture may be divided into a plurality of through-spaces by the ribs and the through-spaces may have different sizes.

The second port may have a shape of which an area changes toward the second open section from the first open section. Additionally, the area of the second port may gradually increase toward the second open section from the first open section. The flow control valve apparatus may further include an actuator disposed in the housing, configured to supply torque, and having a rotary shaft connected to the main valve, to cause the actuator to rotate the main valve by supplying torque.

According to the flow control valve apparatus having the structure described above, a main valve may be configured to adjust the flow rate of cooling water by operating a plurality of ports and a sub-valve that operates with the main valve may be configured to adjust the flow rates of the cooling water circulating through a cylinder block and a cylinder head, to thus variably adjust the flow rate of the cooling water based on the operation conditions of a vehicle, and accordingly, optimal cooling performance may be secured in the operation conditions of the vehicle.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

A flow control valve apparatus according to exemplary embodiments of the present disclosure is described hereafter with reference to the accompanying drawings.

Figure 1:
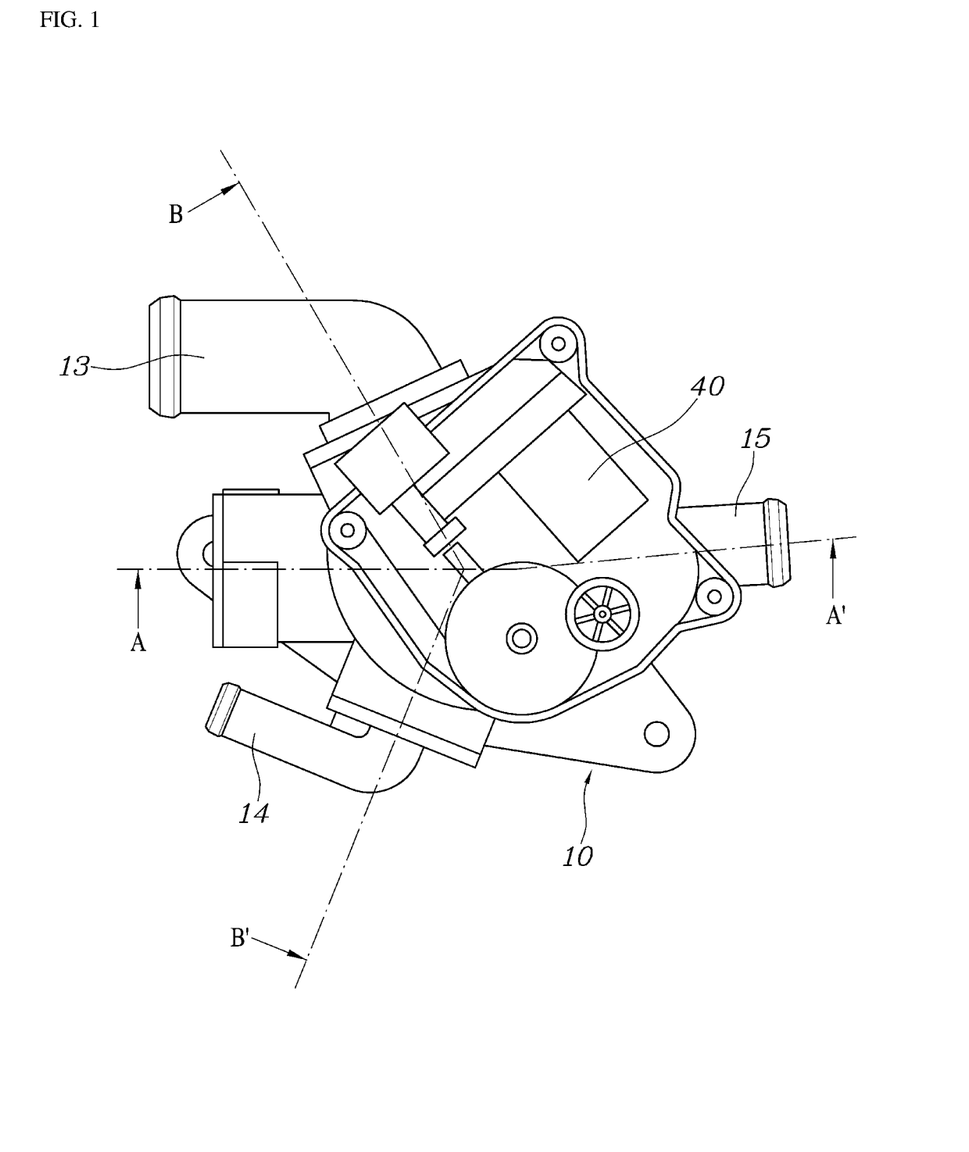
FIG. 1 is a view showing a flow control valve apparatus according to an exemplary embodiment of the present disclosure.
Figure 2:
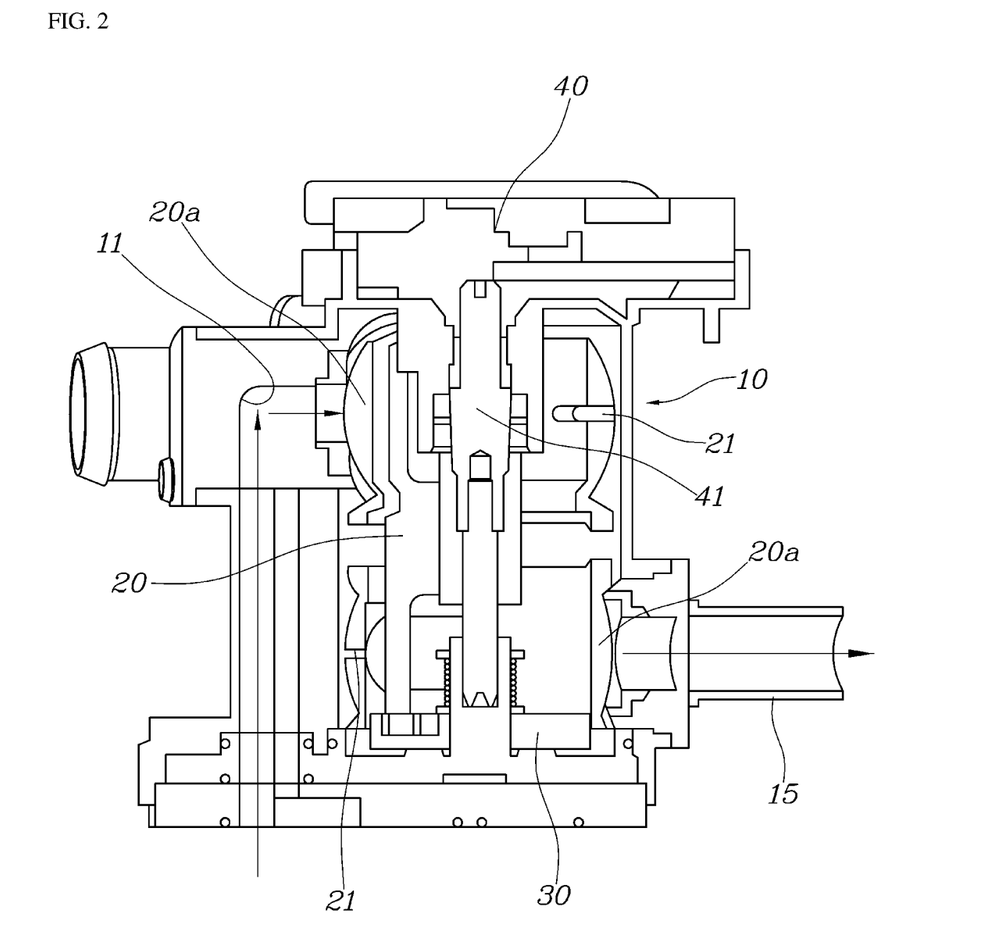
FIG. 2 is a cross-sectional view taken along line A-A' of the flow control valve apparatus shown in FIG. 1 according to an exemplary embodiment of the present disclosure.
Figure 3:
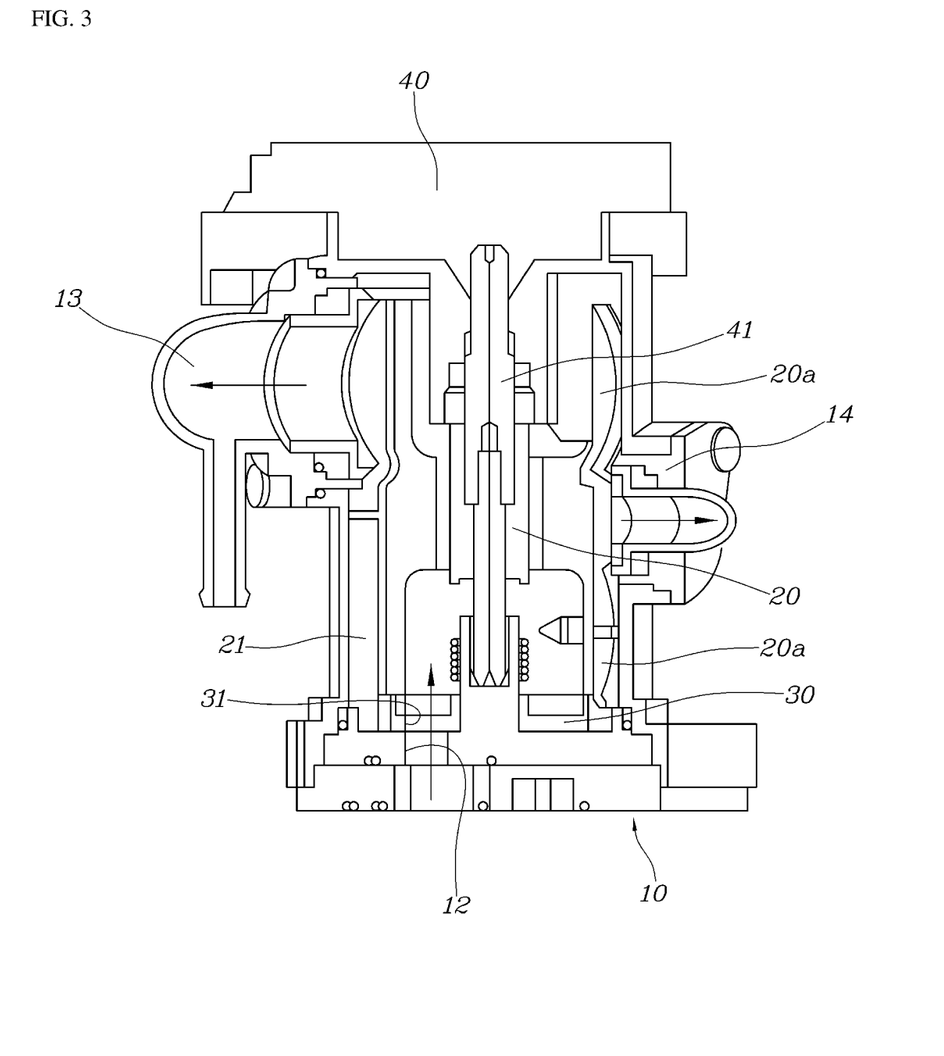
FIG. 3 is a cross-sectional view taken along line B-B' of the flow control valve apparatus shown in FIG. 1 according to an exemplary embodiment of the present disclosure.

A flow control valve apparatus according to the present disclosure, as shown in FIGS. 1 to 3, may include: a housing 10 having a plurality of flow ports including a first port 11 through which cooling water for a cylinder block flows and a second port 12 through which cooling water for a cylinder head flows; a main valve 20 rotatably disposed in the housing 10 and configured to selectively circulate cooling water through some of the flow ports based on rotational angles; and a sub-valve 30 disposed in the second port 12 of the housing 10 and configured to adjust the flow rate of the cooling water flowing through the second port 12 by adjusting the opening amount of the second port 12 based on the rotational angle of the main valve.

According to the present disclosure, as described above, the main valve 20 and the sub-valve 30 may be disposed in the housing 10, the main valve 20 may be configured to adjust the opening amounts of the flow ports, and the sub-valve 30 may be configured to adjust the flow rates of cooling water for the cylinder block and the cylinder head by adjusting the opening amount of the second port 12. The sub-valve 30 may be configured to adjust the opening amount of the first port 11, but it is more important to secure the flow rate of the cooling water for the cylinder block. Accordingly, the sub-valve 30 may be configured to adjust the flow rate of the cooling water flowing through the second port 12 to cool the cylinder head and to thus efficiently control the cooling water.

The housing 10 may include a plurality of flow ports including the first port 11 through which cooling water for the cylinder block flows and the second port 12 through which cooling water for the cylinder head flows. The flow ports of the housing 10 may include a radiator port 13 through which cooling water for a radiator circulates, an oil port 14 through which cooling water for an oil cooler or an automatic transmission fluid (ATF) warmer circulates, and a heater port 15 through which cooling water for a heater core flows, and may include other passages through which cooling water flows within a vehicle.

The housing 10 may include an actuator 40 configured to supply torque, has a rotary shaft 41 connected to the main valve 20, and may be configured to rotate the main valve 20 by supplying torque. In other words, the actuator 40 may be configured to supply torque to the main valve 20 through the rotary shaft 41 and the rotation thereof may be adjusted by a controller, whereby the rotational angle of the main valve 20 may be changed. The controller may be configured to operate the actuator 40 by combining various items of information according to the operation situations of a vehicle.

Since the main valve 20 may be rotated and the rotational angle thereof may be changed by the actuator 40, the main valve 20 be configured to selectively circulate cooling water through some of the flow ports. In other words, the main valve 20 may have a hollow structure with an open end and may include flow rate control apertures 21 formed in the circumferential surface to be connected to the flow ports including the first port 11 based on the rotational angles, in which the open end is connected to the second port 12. Since the main valve 20 has a hollow structure, as described above, cooling water may circulate through the main valve and the flow rate control apertures 21 may be disposed at different positions to correspond to the first port 11, the radiator port 13, the oil port 14, and the heater port 15 through which cooling water for the cylinder block may circulate, and thus, the flow direction of the cooling water may be changed. The end of the main valve 20 may be open and connected to the second port 12, and thus, the second port 12 may be continuously open and the cooling water for the cylinder head may flow continuously.

The main valve 20, as shown in FIG. 2, has a plurality of layers 20a in the longitudinal direction and the flow rate control apertures 21 are formed through the circumferential surfaces of the layers 20a, and thus, the flow rate control apertures 21 may be connected to the flow ports. The main valve 20 may have various shapes and may have sealing members at the positions connected with the flow ports, and the end of the main valve 20 may be continuously connected with the second port 12, and thus, the cooling water for the cylinder head may flow continuously.

A sub-valve 30 may be coupled to the end of the main valve 20 and rotated with the main valve 20, and thus, the opening amount of the second port 12 may be adjusted based on the rotational angle of the main valve 20, whereby the flow rate of the cooling water flowing through the second port 12 may be adjusted. The rotational positions of the sub-valve 30 may be adjusted by another actuator 40 separately from the main valve 20, but the sub-valve 30 may be rotated together with the main valve 20 by one actuator 40 coupled to the main valve, thus simplifying the structure.

Further, the sub-valve 30 may be made of Teflon having a low friction coefficient or a material that is strong against wear to minimize damage due to friction with the second port 12 when the sub-valve 30 rotates with the main valve 20. The sub-valve 30 has the same shape as the end of the main valve 20 and has a closed cross-section, and an aperture 31 that connects the second port 12 and the hollow portion of the main valve 20 may be formed in the closed cross-section. Since the sub-valve 30 has the same shape as the end of the main valve 20, when the sub-valve 30 is combined with the main valve 20, interference with other parts except for the housing 10 may be prevented. Further, the sub-valve 30 may be connected with the second port 12 by the aperture 31 formed in the closed cross-section.

Figure 4:
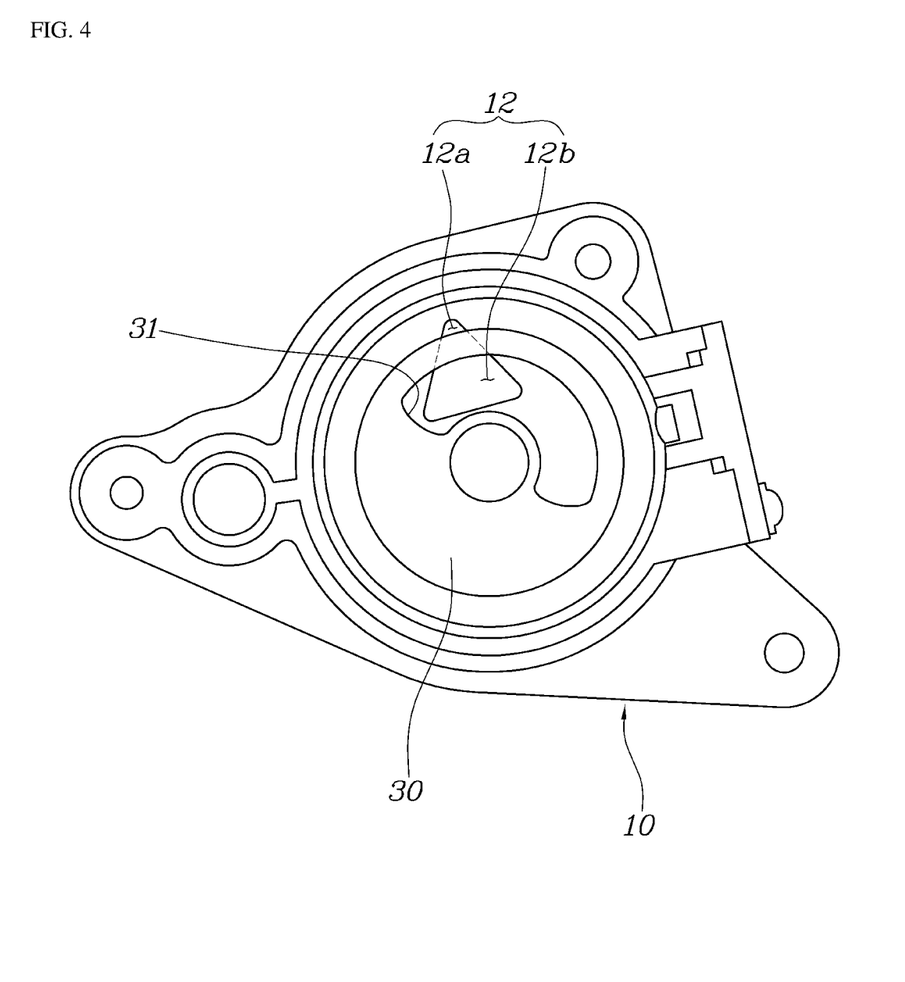
FIGS. 4 and 5 are views illustrating the flow control valve apparatus shown in FIG. 1 according to an exemplary embodiment of the present disclosure.
Figure 5:
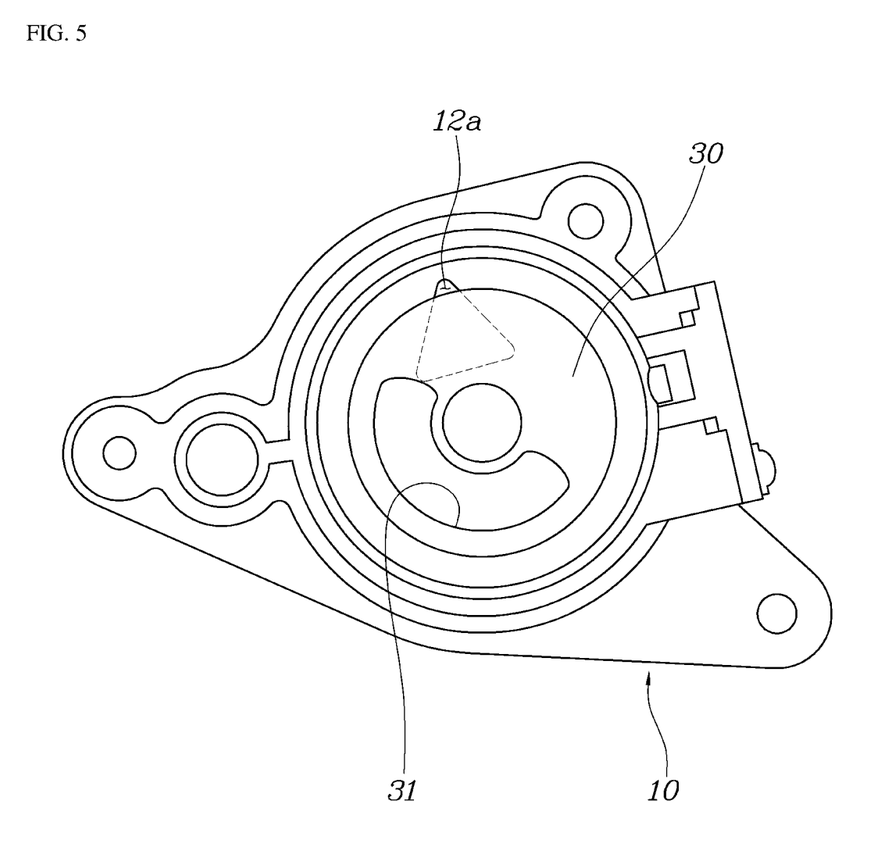

In other words, the sub-valve 3 may be configured to rotate with the main valve 20, and when the aperture 31 is positioned to correspond to the second port 12, depending on the rotational angle, the second port 12 and the hollow portion of the main valve 20 may be connected to each other through the aperture 31, thus increasing the flow rate of cooling water. Further, when the closed cross-section is positioned to correspond to the second port 12, the area of the second port 12 decreases, thus decreasing the flow rate of the cooling water. Accordingly, as shown in FIGS. 4 and 5, the second port 12 may have a first open section 12a that is continuously connected to the inside of the housing 10 and a second open section 12b that extends from the first open section 12a to correspond to the sub-valve 30 and of which the opening amount may be adjusted by whether the aperture 31 is matched.

As described above, the second port 12 is an aperture but has the first open section 12a continuously connected even if the closed cross-section of the sub-valve 30 is matched, and the second open section 12b that is opened when the aperture 31 of the sub-valve 30 is matched and may be closed when the closed cross-section is matched, and thus, the opening amount of the second port 12 may be adjusted by the sub-valve 30. In other words, cooling water may flow continuously through the second port 12 and the flow rate of the cooling water may be adjusted by the sub-valve 30, and thus, the flow rate of the cooling water for the cylinder head or the cooling water for the cylinder block may be adjusted.

The second port 12 may have a shape of which the area changes toward the second open section 12b from the first open section 12a. Accordingly, the flow rate of cooling water may be adjusted based on the rotational angle of the sub-valve 30. The second port 12 may be formed with an area that gradually increases toward the second open section 12b from the first open section 12a, which may be a triangle in an exemplary embodiment. Since the second port 12 has a shape of which the area gradually increases toward the second open section 12b from the first open section 12a, it may be easy to form the second port 12 when forming the housing 10. Further, since the second open section 12b is greater in area than the first open section 12a, the flow rate of cooling water that is adjusted based on the rotational angle of the sub-valve 30 increases, and thus, the effect of adjusting the flow rate of cooling water may be increased.

On the other hand, the aperture 31 extends around the closed cross-section about the axial center of the sub-valve 30, so it may be possible to set the adjustment amount of the opening of the first port 11, the flow ports, and the second port 12 of the housing 10 based on the rotational angle of the sub-valve 30 that follows the rotational angle of the main valve 20.

Figure 6:
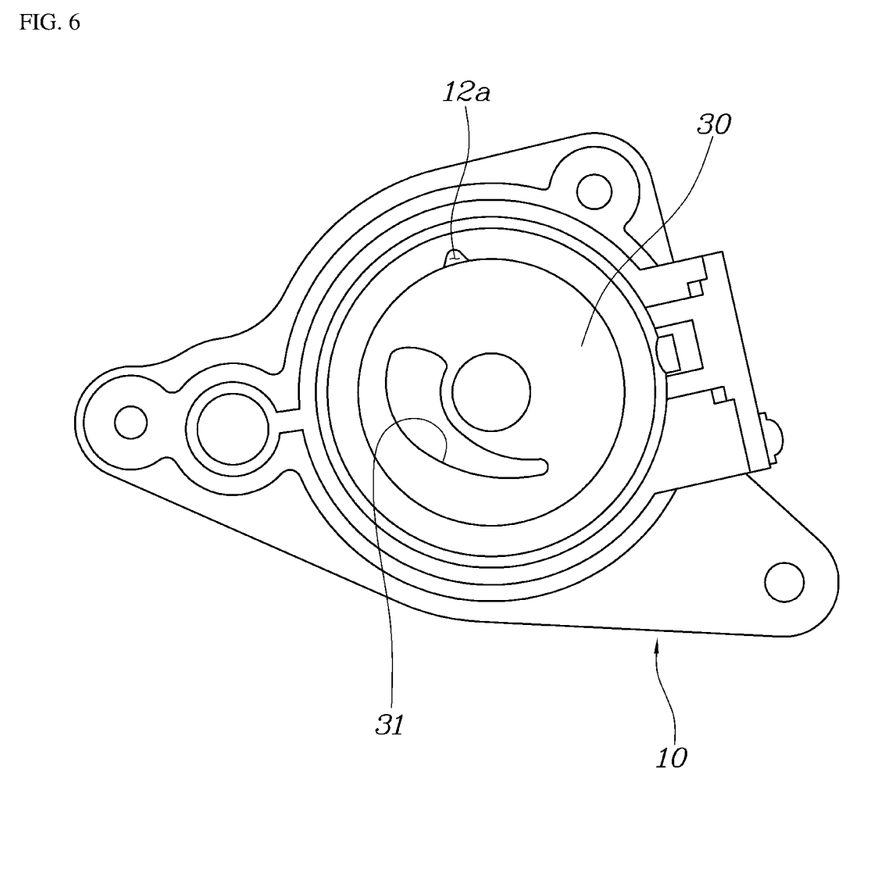
FIG. 6 is a view showing a sub-valve of the flow control valve apparatus shown in FIG. 1 according to an exemplary embodiment of the present disclosure.

The aperture 31, as an exemplary embodiment, may be formed with a width that gradually increases or decreases in the extension direction (e.g., in a rotating direction), as shown in FIG. 6, so it may be possible to accurately and minimally adjust the flow rate of the cooling water flowing through the second port 12 and the hollow portion of the main valve 20. Accordingly, when the sub-valve 30 rotates, the flow rate of the cooling water flowing through the second port 12 and the hollow portion of the main valve 20 may be adjusted gradually to increase, and thus, the flow rate of cooling water may be adjusted to fit desired demands.

Figure 7:
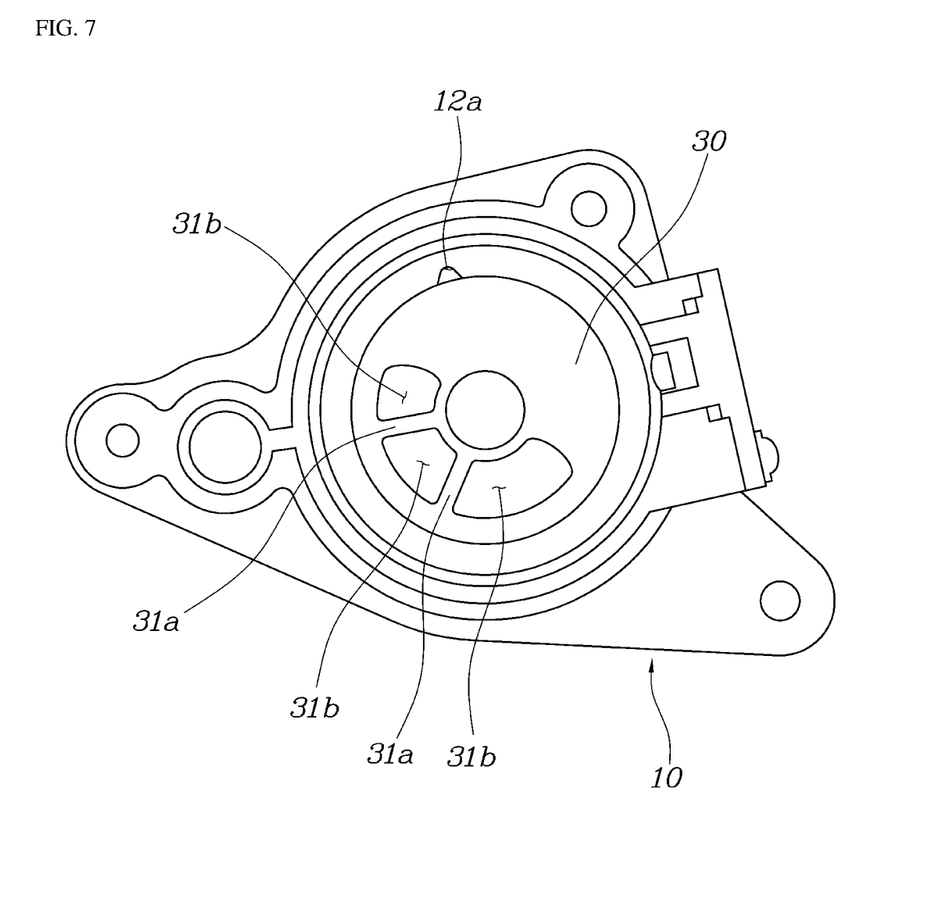
FIG. 7 is a view showing the sub-valve of the flow control valve apparatus shown in FIG. 1 according to another exemplary embodiment of the present disclosure.

As another exemplary embodiment, a plurality of ribs 31a may be formed in the width direction in the aperture 31 and may be spaced apart from each other in the extension direction. In other words, the strength of the sub-valve 30 may decrease at the portion where the aperture 31 is formed, so the plurality of ribs 31a may be disposed in the extension direction of the aperture 31 to secure durability of the sub-valve 30.

The aperture 31 may be divided into a plurality of through-spaces 31b (e.g., sections) by the ribs 31a and the through-spaces 31b may have different sizes. As described above, the strength of the aperture 31 may be secured by the ribs 31a and may be divided into the several through-spaces 31b. Since the through-spaces 31b have different sizes based on the positions of the ribs 31a in the aperture 31, it may be possible to vary the flow rate of the cooling water flowing through the second port 12 and the hollow portion of the main valve 20 in accordance with the sizes of the through-spaces 31b.

Accordingly, it may be possible to adjust the flow rate of the cooling water flowing through the second port 12 and the hollow portion of the main valve 20 when the sub-valve 30 rotates thus improving the efficiency of cooling control according to the flow rate of the cooling water for the cylinder block or the cooling water for the cylinder head by minimally and accurately adjusting the requested flow rates of cooling water.

Cooling control may be performed in various through the flow control valve apparatus according to the present disclosure described above. For example, when the engine of a vehicle is started under a cold condition, the radiator port 13 and the first port 11 corresponding to the cylinder block may be closed and the heater port 15 and the oil port 14 may be closed by adjusting the rotational angle of the main valve 20. In this process, the rotational angle of the sub-valve 30 may be adjusted with the rotational angle of the main vale 20 to open the second port 12 to increase the flow rate of cooling water flowing through the second port 12. In other words, the flow rate of the cooling water for the cylinder block decreases compared to the flow rate of the cooling water for the cylinder head, and thus, the temperate of the engine may be increased rapidly.

Further, when the temperature of cooling water is greater than a set temperature, the rotational angle of the main valve 20 may be adjusted to open the radiator port 13 and the first port 11 corresponding to the cylinder block. In this process, the rotational angle of the sub-valve 30 may be adjusted with the rotational angle of the main vale 20 to close the second open section 12b of the second port 12, to thus decrease flow rate of cooling water flowing through the second port 12. In other words, the flow rate of the cooling water for the cylinder block increases compared to the flow rate of the cooling water for the cylinder head, thus protecting the engine from overheating and the temperature of the cooling water may be adjusted.

As described above, according to the present disclosure, the flow rates of the cooling water flowing through the first port 11, the radiator port 13, the oil port 14, and the heater port 15 may be adjusted based on the temperature of the cooling water, the temperature of an engine, and the load state of a vehicle. In particular, the opening amount of the second port 12 may be adjusted by the sub-valve 30, whereby the flow rate of the cooling water for the cylinder block or the cylinder head may be adjusted. Therefore, the flow rate of the cooling water may be appropriately adjusted based on the operation conditions of a vehicle, the cooling efficiency may be improved and accordingly the performance of the vehicle may be improved.

According to the flow control valve apparatus having the structure described above, the main valve may be configured to adjust the flow rate of cooling water by operating a plurality of ports and the sub-valve 30 that operates with the main valve 20 may be configured to adjust the flow rates of the cooling water circulating through a cylinder block and a cylinder head, and thus, flow rate of the cooling water may be variously adjusted based on the operation conditions of a vehicle, and accordingly, optimal cooling performance may be secured in the operation conditions of the vehicle.

Although the present disclosure was provided above in relation to specific embodiments shown in the drawings, it is apparent to those skilled in the art that the present disclosure may be changed and modified in various ways without departing from the scope of the present disclosure, which is described in the following claims.

What is claimed is:

1. A flow control valve apparatus, comprising:
a housing having a plurality of flow ports including a first port through which cooling water for a cylinder block flows and a second port through which cooling water for a cylinder head flows;
a main valve rotatably disposed in the housing and selectively circulating cooling water through some of the flow ports based on rotational angles; and
a sub-valve disposed in the second port of the housing and configured to adjust a flow rate of the cooling water flowing through the second port by adjusting the opening amount of the second port based on the rotational angle of the main valve,
wherein the second port has a first open section connected to be continuously opened to an inside of the housing to allow cooling water to flow continuously through the second port and a second open section that extends from the first open section to the sub-valve and having an opening amount that is adjusted by the sub-valve.

2. The flow control valve apparatus of claim 1, wherein the main valve has a hollow structure with an open end and has flow rate apertures provided in a circumferential surface to be connected to the flow ports including the first port in accordance with rotational angles, and the open end is connected to the second port.

3. The flow control valve apparatus of claim 2, wherein the sub-valve is coupled to the end of the main valve and is configured to rotate with the main valve.

4. The flow control valve apparatus of claim 2, wherein the sub-valve has a same shape as the end of the main valve and has a closed cross-section, and an aperture that connects the second port and a hollow portion of the main valve is provided in the closed cross-section.

5. The flow control valve apparatus of claim 4, wherein the aperture extends around the closed cross-section about an axial center of the sub-valve.

6. The flow control valve apparatus of claim 5, wherein the aperture has a width that gradually increases or gradually decreases in an extension direction.

7. The flow control valve apparatus of claim 4, wherein a plurality of ribs are provided in a width direction in the aperture and the ribs are spaced apart from each other in an extension direction.

8. The flow control valve apparatus of claim 4, wherein the aperture is divided into a plurality of through-spaces by a plurality of ribs and the through-spaces have different sizes.

9. The flow control valve apparatus of claim 1, wherein the second port has a shape of which an area changes toward the second open section from the first open section.

10. The flow control valve apparatus of claim 9, wherein the second port has an area that gradually increases toward the second open section from the first open section.

11. The flow control valve apparatus of claim 1, further comprising:
an actuator disposed within the housing, configured to supply torque, and having a rotary shaft connected to the main valve to rotate the main valve by supplying torque.

* * * * *